(12) United States Patent
Kimura et al.

(10) Patent No.: US 11,180,641 B2
(45) Date of Patent: Nov. 23, 2021

(54) RUBBER COMPOSITION FOR TIRES

(71) Applicant: The Yokohama Rubber Co., LTD., Tokyo (JP)

(72) Inventors: Kazushi Kimura, Hiratsuka (JP); Hirokazu Kageyama, Hiratsuka (JP); Satoshi Mihara, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/079,987

(22) PCT Filed: Feb. 22, 2017

(86) PCT No.: PCT/JP2017/006635
§ 371 (c)(1),
(2) Date: Aug. 24, 2018

(87) PCT Pub. No.: WO2017/146107
PCT Pub. Date: Aug. 31, 2017

(65) Prior Publication Data
US 2019/0062536 A1    Feb. 28, 2019

(30) Foreign Application Priority Data

Feb. 26, 2016    (JP) .............................. JP2016-035170

(51) Int. Cl.
| | | |
|---|---|---|
| *C08L 9/06* | (2006.01) | |
| *B60C 1/00* | (2006.01) | |
| *C08L 81/04* | (2006.01) | |
| *C08L 21/00* | (2006.01) | |
| *C08K 3/04* | (2006.01) | |
| *C08K 3/00* | (2018.01) | |

(52) U.S. Cl.
CPC ...................... *C08L 9/06* (2013.01); *B60C 1/00* (2013.01); *B60C 1/0016* (2013.01); *C08K 3/00* (2013.01); *C08K 3/04* (2013.01); *C08L 21/00* (2013.01); *C08L 81/04* (2013.01); *C08L 2205/025* (2013.01); *C08L 2205/03* (2013.01); *C08L 2205/14* (2013.01); *C08L 2312/00* (2013.01)

(58) Field of Classification Search
CPC ..................................... C08L 9/06; B60C 1/00
USPC ......................................................... 524/526
See application file for complete search history.

(56) References Cited

U.S. PATENT DOCUMENTS

| | | | |
|---|---|---|---|
| 2014/0100321 A1* | 4/2014 | Maejima .................. | C08L 7/00 524/506 |
| 2016/0237253 A1 | 8/2016 | Kakubo et al. | |
| 2019/0048174 A1 | 2/2019 | Rubber | |

FOREIGN PATENT DOCUMENTS

| | | | |
|---|---|---|---|
| DE | 11 2017 000 788 | 10/2018 | |
| JP | 2014-062141 | * 4/2014 | |
| JP | 2015-067635 | 4/2015 | |
| JP | 2015-067636 | 4/2015 | |
| WO | WO2012/144605 | * 10/2012 | |
| WO | WO 2012/144605 | 10/2012 | |
| WO | WO-2012144605 A1 | * 10/2012 | .............. C08L 21/00 |
| WO | WO 2015/046154 | 4/2015 | |
| WO | WO 2017/138603 | 8/2017 | |

OTHER PUBLICATIONS

International Search Report for International Application No. PCT/JP2017/006635 dated Apr. 4, 2017, 4 pages, Japan.

* cited by examiner

*Primary Examiner* — Deve V Hall
(74) *Attorney, Agent, or Firm* — Thorpe North & Western

(57) ABSTRACT

Provided is a rubber composition including: (i) a sulfur vulcanizable elastomer, (ii) carbon black and/or a white filler, and (iii) a microparticle having a three-dimensionally crosslinked structure; the microparticle being a microparticle obtained by three-dimensionally crosslinking a polymer formed from an oligomer or prepolymer that has a sulfide bond formed from two or more sulfur atoms in a main chain and/or that has a thiol group.

12 Claims, 1 Drawing Sheet

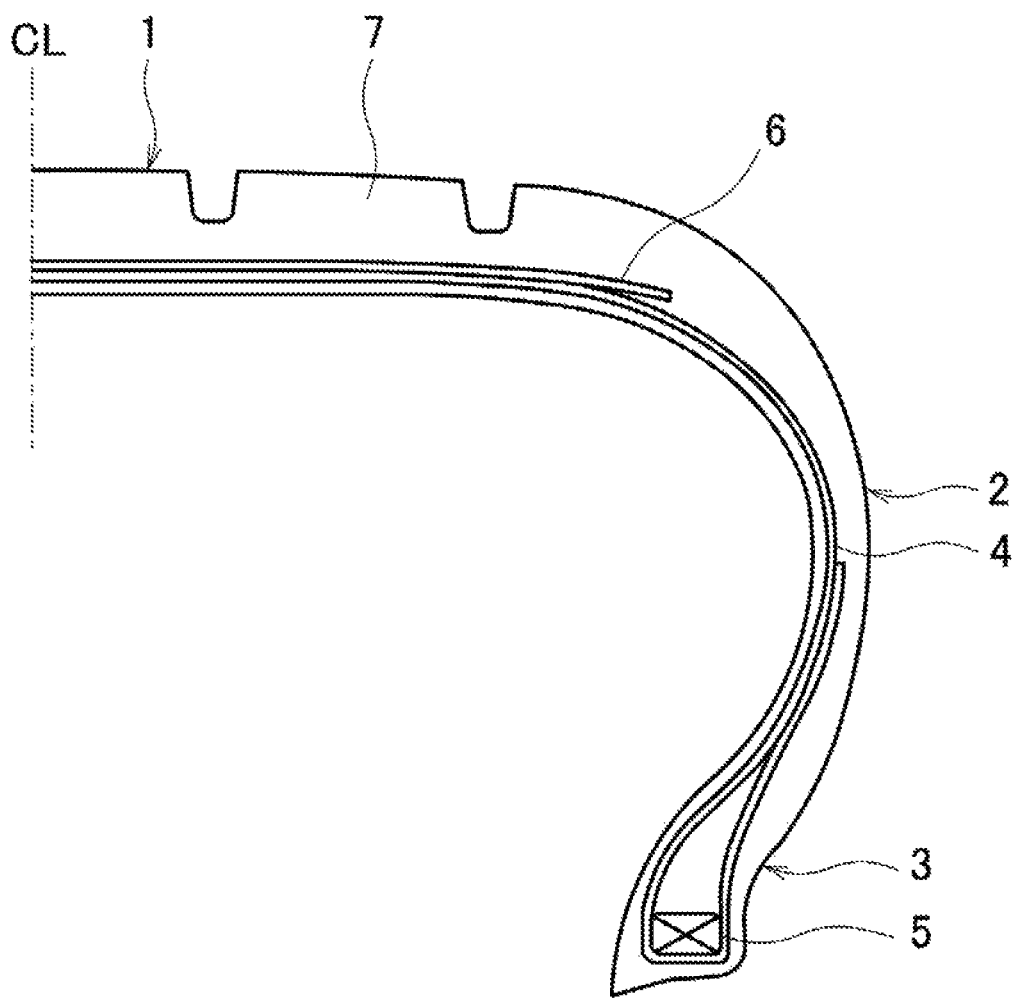

RUBBER COMPOSITION FOR TIRES

TECHNICAL FIELD

The present technology relates to a rubber composition for tires, the rubber composition containing a novel organic microparticle having a crosslinked structure.

BACKGROUND ART

In recent years, pneumatic tires with higher performance have been developed, and various studies have been carried out while enhancement in mechanical properties, especially tensile stress and rebound resilience, of rubber compositions for tires has been demanded.

Japan Unexamined Patent Publication Nos. 2015-067635 and 2015-067636 propose blending of three-dimensionally crosslinked microparticles in rubber compositions for tires. The three-dimensionally crosslinked microparticles are advantageous to enhance performance on ice and wear resistance of studless tires due to the small JIS (Japanese Industrial Standard) A hardness. On the other hand, when the three-dimensionally crosslinked microparticles are blended, there is a problem that it is not possible to improve and enhance tensile stress and rebound resilience of rubber compositions.

SUMMARY

The present technology provides a rubber composition for tires, by which tensile stress and rebound resilience are enhanced equal to or beyond conventional levels while reductions in tensile strength at break and tensile elongation at break are suppressed.

The rubber composition for tires according to an embodiment of the present technology includes: (i) a sulfur vulcanizable elastomer, (ii) carbon black and/or a white filler, and (iii) a microparticle having a three-dimensionally crosslinked structure; the microparticle being a microparticle obtained by three-dimensionally crosslinking a polymer formed from an oligomer or prepolymer that has a sulfide bond formed from two or more sulfur atoms in a main chain and/or that has a thiol group.

According to the rubber composition for tires according to an embodiment of the present technology, tensile stress and rebound resilience can be enhanced equal to or beyond conventional levels while reductions in tensile strength at break and tensile elongation at break are suppressed because the rubber composition contains a novel microparticle obtained by three-dimensionally crosslinking a polymer formed from an oligomer or prepolymer, the oligomer or prepolymer being an organic microparticle that has a sulfide bond formed from two or more sulfur atoms in a main chain and/or that has a thiol group.

In an embodiment of the present technology, the oligomer or prepolymer can further contain the sulfide bond and/or the thiol group, and a functional group except the thiol group; and the microparticle can have a three-dimensionally crosslinked structure formed by interposing at least one selected from the group consisting of the sulfide bond and/or the thiol group and the functional group except the thiol group. The functional group except the thiol group is preferably at least one selected from the group consisting of a hydroxyl group, an isocyanate group, an amino group, a glycidyl group, a silanol group, an alkoxysilyl group, a vinyl group, and a (meth)acryloyl group. The number average molecular weight of the oligomer or prepolymer is preferably from 500 to 20000. The average particle size of the microparticle constituting the three-dimensionally crosslinked structure can be from 0.001 to 100 μm.

The rubber composition for tires according to an embodiment of the present technology can contain, per 100 parts by mass of the sulfur vulcanizable elastomer, from 1 to 120 parts by mass of the carbon black and/or the white filler, and from 1 to 50 parts by mass of the microparticle having the three-dimensionally crosslinked structure.

The crosslinked structure of the microparticle having the three-dimensionally crosslinked structure can be a crosslinked structure formed by allowing the functional group to crosslink the polymers in at least one dispersion medium selected from the group consisting of water, an organic solvent, a nonreactive solvent, and the sulfur vulcanizable elastomer. Herein, the microparticle having the three-dimensionally crosslinked structure can be a composite substance containing at least one part of the carbon black and/or the white filler, and/or another organic microparticle.

The rubber composition for tires according to an embodiment of the present technology can be used in pneumatic tires, and in tire tread portions in particular.

BRIEF DESCRIPTION OF DRAWINGS

FIG. 1 is a cross-sectional view in a tire meridian direction that illustrates an example of an embodiment of a pneumatic tire in which a rubber composition for tires according to an embodiment of the present technology is used.

DETAILED DESCRIPTION

A pneumatic tire illustrated in FIG. 1 has a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of the belt layer 6. The rubber composition for tires according to an embodiment of the present technology can be advantageously used in the tread rubber 7 or the sidewall portion 2. Among these, application in the tread rubber 7 is particularly preferred.

(i) Sulfur Vulcanizable Elastomer

In the rubber composition for tires according to an embodiment of the present technology, the rubber component is a sulfur vulcanizable elastomer having a carbon-carbon double bond in its main chain. Examples of the sulfur vulcanizable elastomer include natural rubber (NR), isoprene rubber (IR), styrene-butadiene rubber (SBR), butadiene rubber (BR), acrylonitrile butadiene rubber (NBR), butyl rubber (IIR), chlorinated butyl rubber (Cl-IIR), brominated butyl rubber (Br-IIR), chloroprene rubber (CR), and the like, and a single type or a discretionary blend of these can be used. Furthermore, an olefin rubber, such as ethylene propylene diene rubber (EPDM), styrene isoprene rubber, styrene isoprene butadiene rubber, and isoprene butadiene rubber, may be blended. Among these, natural rubber, styrene-butadiene rubber, butadiene rubber, and butyl rubber are preferable as the sulfur vulcanizable elastomer.

(ii) Carbon Black and/or White Filler

The rubber composition for tires according to an embodiment of the present technology contains carbon black and/or a white filler. By allowing the microparticles having the three-dimensionally crosslinked structure to be contained together with the carbon black and/or the white filler, superior tensile stress and rebound resilience of the rubber composition for tires can be achieved.

Examples of the carbon black include furnace carbon blacks, such as SAF (Super Abrasion Furnace), ISAF (Intermediate Super Abrasion Furnace), HAF (High Abrasion Furnace), FEF (Fast Extrusion Furnace), GPF (General Purpose Furnace), and SRF (Semi-Reinforcing Furnace), and one of these can be used alone, or two or more types can be used in combination.

The nitrogen adsorption specific surface area ($N_2SA$) of the carbon black is not particularly limited but is preferably from 10 to 300 $m^2/g$, more preferably from 20 to 200 $m^2/g$, and even more preferably from 50 to 150 $m^2/g$. In the present specification, the nitrogen adsorption specific surface area is measured in accordance with JIS K 6217-2.

Examples of the white filler include silica, calcium carbonate, magnesium carbonate, talc, clay, alumina, aluminum hydroxide, titanium oxide, and calcium sulfate. Among these, silica is preferable. One of these white fillers can be used alone, or two or more types of these white fillers can be used in combination.

Examples of the silica include wet silica (hydrous silicic acid), dry silica (silicic anhydride), calcium silicate, aluminum silicate. Among these, wet silica is preferable. One of these silicas can be used alone, or two or more types of these silicas can be used in combination.

The silica compounded in the rubber composition for tires preferably has the CTAB adsorption specific surface area of 50 to 300 $m^2/g$, more preferably from 70 to 250 $m^2/g$, and even more preferably from 90 to 200 $m^2/g$. The CTAB (cetyltrimethylammonium bromide) adsorption specific surface area of the silica is measured in accordance with JIS K 6217-3.

In an embodiment of the present technology, the compounded amount of the carbon black and/or the white filler is, in terms of the total amount of the carbon black and the white filler, preferably from 1 to 120 parts by mass, more preferably from 5 to 110 parts by mass, and even more preferably from 10 to 100 parts by mass, per 100 parts by mass of the sulfur vulcanizable elastomer.

When the silica is blended in the rubber composition for tires, it is preferable to blend a silane coupling agent together with the silica because dispersibility of the silica in the sulfur vulcanizable elastomer can be enhanced. The compounded amount of the silane coupling agent is preferably from 3 to 15 mass %, and more preferably from 4 to 10 mass %, relative to the compounded amount of the silica. When the compounded amount of the silane coupling agent is less than 3 mass %, dispersibility of the silica cannot be sufficiently enhanced. Furthermore, when the compounded amount of the silane coupling agent is greater than 15 mass %, the silane coupling agents aggregate and condense, and the desired effects cannot be obtained.

The type of silane coupling agent to be used is not particularly limited, but sulfur-containing silane coupling agents are preferable. Examples of the sulfur-containing silane coupling agent include bis-(3-triethoxysilylpropyl) tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

(iii) Microparticle Having Three-Dimensionally Crosslinked Structure

In the rubber composition for tires according to an embodiment of the present technology, a microparticle having a three-dimensionally crosslinked structure is blended in the sulfur vulcanizable elastomer described above. By blending the microparticle, tensile stress and rebound resilience can be enhanced equal to or beyond conventional levels while reductions of tensile strength at break and tensile elongation at break of the rubber composition for tires are suppressed.

The compounded amount of the microparticle having a three-dimensionally crosslinked structure is preferably from 1 to 50 parts by mass, more preferably from 2 to 40 parts by mass, and even more preferably from 4 to 30 parts by mass, per 100 parts by mass of the sulfur vulcanizable elastomer. When the compounded amount of the microparticle having a three-dimensionally crosslinked structure is less than 1 part by mass, effect of enhancing tensile stress and rebound resilience may not be sufficiently achieved. Furthermore, when the compounded amount of the microparticle having a three-dimensionally crosslinked structure is greater than 50 parts by mass, cost of the rubber composition for tires may be higher.

In an embodiment of the present technology, the average particle size of the microparticles having three-dimensionally crosslinked structures is preferably from 0.001 to 100 μm, more preferably from 0.002 to 20 μm, even more preferably from 0.005 to 5 μm, and particularly preferably from 0.01 to 1 μm. When the average particle size of the microparticles having three-dimensionally crosslinked structures is less than 0.001 μm, dispersibility in the sulfur vulcanizable elastomer is reduced. Furthermore, when the average particle size of the microparticles having three-dimensionally crosslinked structures is greater than 100 μm, tensile stress and rebound resilience cannot be sufficiently enhanced. In the present specification, the average particle size refers to an average value of equivalent circle diameters measured by using a laser microscope. For example, the measurement can be performed by using the laser diffraction scattering particle size distribution analyzer LA-300 (available from Horiba, Ltd.) or the laser microscope VK-8710 (available from Keyence Corporation).

The microparticle having a three-dimensionally crosslinked structure is a microparticle obtained by three-dimensionally crosslinking a polymer formed from an oligomer or prepolymer. This polymer is formed from an oligomer or prepolymer having a sulfide bond formed from two or more sulfur atoms in its main chain, and/or an oligomer or prepolymer having a thiol group.

The sulfide bond formed from two or more sulfur atoms is a bond to which two or more sulfur atoms are linked, such as disulfide bonds, trisulfide bonds, and tetrasulfide bonds (hereinafter, also referred to as "polysulfide bond"). Examples of the oligomer or prepolymer having the polysulfide bond in the main chain include liquid polysulfide polymers, polyethers having disulfide bonds, and block polymers of a polysulfide polymer and a polyether. Furthermore, it is also possible to form one molecule of a compound having a disulfide bond via oxidization of two molecules of thiol compounds. Furthermore, examples of the compound having a tetrasulfide bond include dipentamethylenethiuram tetrasulfide, benzimidazolyl-based tetrasulfide compounds, and tetrasulfide-based silane coupling agents. In particular, it is also possible to add a tetrasulfide-based silane coupling agent to various oligomer or prepolymer via the modification by the silanol condensation. Furthermore, the oligomer or prepolymer having a thiol group has a thiol group in its terminal or side chain of the molecular chain. Examples thereof include monomercapto compounds, such as alkylmercaptan and mercaptosilane, and polymers having a mercapto group of a polyfunctional thiol compound. Note that these polysulfide bonds and thiol groups may participate the crosslinking of a copolymer constituting the microparticle having a three-dimensionally crosslinked structure.

The oligomer or prepolymer having a polysulfide bond and/or a thiol group further has functional groups except the thiol group and the polysulfide bond, and the three-dimensionally crosslinked structure is formed by allowing these functional groups to participate in the crosslinking.

The functional group except the thiol group contained in the oligomer and the prepolymer may be a functional group derived from the monomer or a functional group introduced to a polymer. Preferred examples of the type of the functional group include a carboxyl group, an epoxy group, a glycidyl group, an acyl group, a vinyl group, a (meth) acryloyl group, an acid anhydride group, a hydroxyl group, a silanol group, an alkoxysilyl group, an amino group, and an isocyanate group. More preferably, the functional group is preferably at least one selected from the group consisting of a hydroxyl group, an isocyanate group, an amino group, a glycidyl group, a silanol group, an alkoxysilyl group, a vinyl group, and a (meth)acryloyl group.

The functional group contained in the oligomer and the prepolymer constitute at least a part of the crosslinked structure in which polymers constituting the microparticle having a three-dimensionally crosslinked structure are bonded to each other. The crosslinked structure may be a structure in which the functional group described above directly links adjacent polymers, or the functional group may form a crosslinked structure by acting on a crosslinking agent that is added separately.

In an embodiment of the present technology, the number average molecular weight of the oligomer and the prepolymer described above is preferably from 500 to 20000, more preferably from 500 to 15000, and even more preferably from 1000 to 10000. When the number average molecular weight of the oligomer and the prepolymer is less than 500, physical properties of the rubber composition for tires cannot be sufficiently enhanced. Furthermore, when the number average molecular weight of the oligomer and the prepolymer is greater than 20000, it becomes difficult to adjust the particle size when the microparticle is formed. In the present specification, the number average molecular weight is measured by gel permeation chromatography (GPC) based on calibration with polystyrene standards.

The microparticle having a three-dimensionally crosslinked structure that is compounded in the rubber composition for tires is a microparticle formed by crosslinking a polymer, to which an oligomer or prepolymer having a polysulfide bond and/or a thiol group and a functional group has been added in a dispersion medium formed from water, an organic solvent, a nonreactive solvent, or a sulfur vulcanizable elastomer, by using a functional group; or by forming a polymer by adding an oligomer or prepolymer in these dispersion media and then crosslinking this.

When the microparticle having a three-dimensionally crosslinked structure is prepared, the crosslinked structure is preferably formed by crosslinking the polymers to be bonded by the functional group of the oligomer and the prepolymer in a dispersion medium formed from water, an organic solvent, or a nonreactive solvent.

Alternatively, when the microparticle having a three-dimensionally crosslinked structure is prepared, the crosslinked structure is preferably formed by crosslinking the segments to be bonded by the functional group of the oligomer and the prepolymer in a dispersion medium formed from a rubber component. Note that the rubber component used in the dispersion medium may be the type that is the same as at least one part of the sulfur vulcanizable elastomer constituting the rubber composition for tires.

By allowing at least one part of the carbon black and/or the white filler and/or another organic microparticle to coexist with the sulfur vulcanizable elastomer, a composite of a microparticle having a three-dimensionally crosslinked structure and at least one selected from the group consisting of the carbon black, the white filler, and the other organic microparticle can be obtained. By blending such a composite microparticle into the rubber composition for tires, similarly to the case where the microparticle having a three-dimensionally crosslinked structure is blended, tensile stress and rebound resilience can be enhanced equal to or beyond conventional levels while reductions in tensile strength at break and tensile elongation at break are suppressed.

In an embodiment of the present technology, in addition to the functional group described above, a crosslinking catalyst, a crosslinking agent, and a solvent (dispersion medium) can be used for the crosslinking. The crosslinking catalyst and the crosslinking agent can be selected as appropriate depending on the type of the functional group. As the dispersion medium, water, organic solvents, nonreactive solvents, and sulfur vulcanizable elastomers are preferable. Examples of such a dispersion medium include water; aliphatic hydrocarbons, such as n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and isooctane; alicyclic hydrocarbons, such as cyclopentane, cyclohexane, and methylcyclopentane; aromatic hydrocarbons, such as xylene, benzene, and toluene; and terpene-based organic solvents, such as α-pinene, β-pinene, and limonene.

Furthermore, compounding agents, such as surfactants, emulsifiers, dispersants, and silane coupling agents, can be used as necessary in the crosslinking.

In the rubber composition for tires, compounding agents that are typically used in rubber compositions for tires for industrial use, such as vulcanizing agents, vulcanization accelerators, vulcanization aids, rubber reinforcing agents, softeners (plasticizers), anti-aging agents, processing aids, activators, mold release agents, heat-resistance stabilizers, weathering stabilizers, antistatic agents, coloring agents, lubricants, and thickeners, can be added. As long as the performance of the present technology is not impaired, these compounding agents can be applied in compounded amounts that are typically used, and can be added, kneaded, or mixed by a typical preparation method.

The rubber composition for tires according to an embodiment of the present technology can constitute a tread portion or a sidewall portion of a pneumatic tire. Among these, the rubber composition preferably constitutes a tire tread portion. A pneumatic tire, in which the rubber composition for tires according to an embodiment of the present technology is used in these portions, can achieve improved tire durability performance equal to or beyond conventional levels.

The present technology is further described below by Examples. However, the scope of the present technology is not limited to these Examples.

EXAMPLES

Production Example 1 (Production of Microparticle 1)

100 g of liquid polysulfide polymer (THIOKOL LP-3, available from Toray Fine Chemicals Co., Ltd.; an oligomer having a segment formed from a repeating unit having a thiol group at a molecular terminal and a disulfide bond in a main chain; number average molecular weight: 1000), 20 g of SRF-grade carbon black (Asahi #500, available from Asahi Carbon Co., Ltd.), 5 g of zinc oxide (Zinc Oxide III, available from Seido Chemical Industry Co., Ltd.), 8 g of paraquinone dioxime (VULNOC GM-P (GM), available from Ouchi Shinko Chemical Industrial Co., Ltd.), and 2 g of diphenylguanidine (NOCCELER D (D-P), available from Ouchi Shinko Chemical Industrial Co., Ltd.) were mixed. Thereafter, this was added to a mixed solution in which 200 g of water, 10 g of sorbitan acid-based surfactant (TW-O320V, available from Kao Corporation) were mixed, and the mixture was placed in a high speed dissolver mixer and agitated at a rotational speed of 1000 rpm for 10 minutes. Thereafter, the temperature was increased to 70° C. and the agitation speed was lowered to 500 rpm and the agitation was continued for 10 hours. Thereafter, the pressure was lowered gradually, to finally obtain a microparticle-containing compound from which water had been vaporized. When observation was performed by using a laser microscope, it was confirmed that spherical microparticles of approximately 5 μm were produced and contained. These were used as "microparticles 1".

Production Example 2 (Production of Microparticle 2)

In 15 g of methyl ethyl ketone (MEK, reagent), 8.5 g of dimethylol butanoic acid (DMBA, reagent) and 5 g of triethylamine (TEA, reagent) were mixed and dissolved. To this, 100 g of oligomer having a hydroxy group as a functional group and having a disulfide bond in a main chain (SULBRID 12, available from Daito Sangyo Co., Ltd.; number average molecular weight: 2500) and 20 g of xylylene diisocyanate (Takenate 500, available from Mitsui Chemicals, Inc.) were added and mixed. To this, 300 g of water and 20 g of sorbitan acid-based surfactant (TW-O320V, available from Kao Corporation) were mixed, and the mixture was placed in a high speed dissolver mixer and agitated at a rotational speed of 1000 rpm for 10 minutes. Thereafter, the temperature was increased to 60° C., the rotation speed was lowered to 500 rpm, and the agitation was continued for 3 hours. Thereafter, the pressure was lowered gradually and finally water was vaporized to finally obtain a microparticle-containing compound. When observation was performed by using a laser microscope, it was confirmed that spherical microparticles of approximately 1 to 10 μm were contained. These were used as "microparticles 2".

Production Example 3 (Production of Microparticle 3)

A manganese dioxide paste of 50 g of manganese dioxide (reagent) and 50 g of dibutyl phthalate (DBP, reagent) was prepared. 100 g of liquid polysulfide polymer (THIOKOL LP-3, available from Toray Fine Chemicals Co., Ltd.; an oligomer having a segment formed from a repeating unit having a mercapto group at a molecular terminal and a disulfide bond in a main chain; number average molecular weight: 1000), 5 g of fumed silica (Aerosil 200, available from Nippon Aerosil Co., Ltd.), and 10 g of manganese dioxide paste prepared in advance were mixed. This was added to a mixed solution in which 200 g of water, 10 g of sorbitan acid-based surfactant (TW-O320V, available from Kao Corporation) were mixed, and the mixture was placed in a high speed dissolver mixer and agitated at a rotational speed of 1000 rpm for 10 minutes. The agitation speed was lowered to 500 rpm and the agitation was continued for 10 hours. Thereafter, the pressure was lowered gradually, to finally obtain a microparticle-containing compound from which water had been vaporized. When this was observed by using a laser microscope, it was confirmed that spherical microparticles of approximately 10 μm were produced and contained. These were used as "microparticles 3".

Production Example 4 (Production of Microparticle 4)

200 g of polycarbonate diol (T6001, available from Asahi Kasei Corporation; number average molecular weight: 1000) and 100 g of 4,4'-diphenylmethane diisocyanate (Millionate MT, available from Nippon Polyurethane Industry Co., Ltd.; number average molecular weight: 250) were reacted at 80° C. for 5 hours to obtain a polycarbonate urethane prepolymer end-capped with isocyanate (reaction product 1). Thereafter, to 44 g of the obtained urethane prepolymer (reaction product 1), 3.5 g of methyl isobutyl ketone (MIBK, reagent), 2.0 g of dimethylol butanoic acid (DMBA, reagent), and 1.5 g of triethylamine (TEA, reagent) were mixed and agitated for 10 minutes. Thereafter, 77 g of water, 4.0 g of sorbitan acid-based surfactant (TW-O320V, available from Kao Corporation), and 0.06 g of dibutyltin dilaurate (DBTL, reagent) were added and agitated at a dissolver rotational speed of 1000 rpm for 10 minutes by using an agitator equipped with a dissolver. Thereafter, the temperature was gradually increased to 70° C. and agitation was continued for 1 hour to obtain a milky white emulsion solution. Thereafter, the pressure was lowered gradually, and finally water was vaporized to obtain organic microparticles. When these were observed by using a laser microscope, it was confirmed that spherical microparticles of approximately 1 to 5 μm were contained.

Separately from this, 100 g of oligomer having a disulfide bond in a main chain (SULBRID 12, available from Daito Sangyo Co., Ltd.; number average molecular weight: 2500), 20 g of xylylene diisocyanate (Takenate 500, available from Mitsui Chemicals, Inc.), and a mixture, in which 8.5 g of dimethylol butanoic acid (DMBA, reagent) and 5 g of triethylamine (TEA, reagent) were mixed and dissolved in 15 g of methyl ethyl ketone (MEK, reagent), were added and mixed. Furthermore, 30 g of the organic microparticle produced in advance was added to this, and the mixture was placed in a high speed dissolver mixer and agitated at a rotational speed of 1000 rpm for 10 minutes. Thereafter, the temperature was increased to 60° C., the rotation speed was lowered to 500 rpm, and the agitation was continued for 3 hours. Thereafter, the pressure was lowered gradually, and finally water was vaporized to obtain a microparticle-containing compound. When these were observed by using a laser microscope, it was confirmed that spherical microparticles of approximately 1 to 20 μm were contained. These were used as "microparticles 4".

Production Example 5 (Production of Microparticle 5 (Comparative Microparticle))

200 g of polycarbonate diol (T6001, available from Asahi Kasei Corporation; number average molecular weight: 1000) and 100 g of 4,4'-diphenylmethane diisocyanate (Millionate MT, available from Nippon Polyurethane Industry Co., Ltd.; number average molecular weight: 250) were reacted at 80° C. for 5 hours to obtain a polycarbonate urethane prepolymer end-capped with isocyanate (reaction product 2).

Thereafter, to 132 g of the obtained polycarbonate urethane prepolymer end-capped with isocyanate (reaction product 2), 10.5 g of methyl isobutyl ketone (MIBK), 6.0 g of dimethylol butanoic acid (DMBA), and 4.5 g of triethylamine (TEA) were mixed and agitated for 10 minutes.

Thereafter, 250 g of water, 10.0 g of sorbitan acid-based surfactant (TW-0320V, available from Kao Corporation), and 0.15 g of dibutyltin dilaurate (DBTL) were added and agitated at a dissolver rotational speed of 1000 rpm for 10 minutes by using an agitator equipped with a dissolver. Thereafter, the temperature was gradually increased to 70° C. and agitation was continued for 1 hour to obtain a milky white emulsion solution. Thereafter, the pressure was lowered gradually, and finally water was vaporized to obtain a microparticle-containing compound. When observation was performed by using a laser microscope, it was confirmed that spherical microparticles of approximately 1 to 20 μm were contained. These were used as "microparticles 5 (comparative microparticles)".

Preparation and Evaluation of Rubber Composition for Tire

Compounding ingredients other than sulfur and vulcanization accelerators were weighed according to each of the rubber compositions for the 6 types of rubber compositions for tires shown in Table 1 (Examples 1 to 4, Standard Example 1, and Comparative Example 1). These compounding ingredients were kneaded in a 1.7 L sealed Banbury Mixer for 5 minutes. Then, a master batch was discharged at a temperature of 150° C. and cooled at room temperature. The master batch was then fed to a heating roller, and the sulfur and the vulcanization accelerator were then added to the master batch and mixed, and thus each of the 6 types of rubber compositions for tires was prepared. Note that, since SBR was an oil extended product, the net amount of the SBR which did not include the amount of the oil-extending component was shown in parentheses. By using each of the obtained 6 types of rubber compositions for tires, a vulcanized rubber sheet was prepared in a mold having a predetermined shape at 160° C. for 20 minutes. Tensile testing was performed by the following method to evaluate tensile characteristics (tensile stress, tensile strength at break, and tensile elongation at break), rebound resilience, and tan δ at 20° C.

Tensile Test

A dumbbell-shaped JIS No. 3 test piece was cut out from the obtained vulcanized rubber sheet in accordance with JIS K 6251. By using the obtained test piece, tensile stress at 100% deformation, tensile stress at 300% deformation, tensile strength at break, and tensile elongation at break were measured in accordance with JIS K 6251. The obtained results are shown in Table 1 as index values with the value of Standard Example 1 expressed as an index value of 100.

A larger index value indicates superior tensile stress at 100% deformation, superior tensile stress at 300% deformation, superior tensile strength at break, or superior tensile elongation at break.

Rebound Resilience

By using the obtained vulcanized rubber sheet, rebound resilience at a temperature of 40° C. was measured by using a Leupke impact resilience tester in accordance with JIS K 6255. The obtained results are shown in Table 1 as index values with the value of Standard Example 1 expressed as an index value of 100. A larger value of this index value indicates greater rebound resilience and superior fuel efficiency when a pneumatic tire is formed.

Tan δ at 20° C.

Using a viscoelastic spectrometer, available from Toyo Seiki Seisaku-sho, Ltd., dynamic viscoelasticity of the obtained vulcanized rubber sheet was measured at an initial strain of 10%, an amplitude of ±2%, and a frequency of 20 Hz, and the tan δ at a temperature of 20° C. was determined. The obtained results are shown in Table 1 as index values with the value of Standard Example 1 expressed as an index value of 100. A smaller index value indicates greater tan δ (20° C.) and superior grip performance when a pneumatic tire is formed.

TABLE 1

|  |  | Standard Example 1 | Comparative Example 1 | Example 1 | Example 2 | Example 3 | Example 4 |
| --- | --- | --- | --- | --- | --- | --- | --- |
| SBR | Parts by mass | 103 (75) | 103 (75) | 103 (75) | 103 (75) | 103 (75) | 103 (75) |
| BR | Parts by mass | 25 | 25 | 25 | 25 | 25 | 25 |
| Silica | Parts by mass | 80 | 70 | 70 | 70 | 70 | 70 |
| Carbon black | Parts by mass | 10 | 10 | 10 | 10 | 10 | 10 |
| Microparticle 1 | Parts by mass |  |  | 10 |  |  |  |
| Microparticle 2 | Parts by mass |  |  |  | 10 |  |  |
| Microparticle 3 | Parts by mass |  |  |  |  | 10 |  |
| Microparticle 4 | Parts by mass |  |  |  |  |  | 10 |
| Microparticle 5 (comparative microparticle) | Parts by mass |  | 10 |  |  |  |  |
| Silane coupling agent | Parts by mass | 5.0 | 5.0 | 5.0 | 5.0 | 5.0 | 5.0 |
| Zinc oxide | Parts by mass | 3.0 | 3.0 | 3.0 | 3.0 | 3.0 | 3.0 |
| Stearic acid | Parts by mass | 2.0 | 2.0 | 2.0 | 2.0 | 2.0 | 2.0 |
| Anti-aging agent | Parts by mass | 2 | 2 | 2 | 2 | 2 | 2 |
| Sulfur | Parts by mass | 1.5 | 1.5 | 1.0 | 1.0 | 1.0 | 1.0 |
| Vulcanization accelerator 1 | Parts by mass | 2.0 | 2.0 | 2.0 | 2.0 | 2.0 | 2.0 |
| Vulcanization accelerator 2 | Parts by mass | 0.5 | 0.5 | 0.5 | 0.5 | 0.5 | 0.5 |
| Oil | Parts by mass | 5 | 5 | 5 | 5 | 5 | 5 |
| Tensile stress at 100% deformation | Index value | 100 | 95 | 109 | 114 | 118 | 127 |
| Tensile stress at 300% deformation | Index value | 100 | 87 | 98 | 101 | 110 | 107 |

TABLE 1-continued

| | | Standard Example 1 | Comparative Example 1 | Example 1 | Example 2 | Example 3 | Example 4 |
|---|---|---|---|---|---|---|---|
| Tensile strength at break | Index value | 100 | 82 | 97 | 96 | 104 | 101 |
| Tensile elongation at break | Index value | 100 | 80 | 99 | 104 | 108 | 105 |
| Rebound resilience | Index value | 100 | 95 | 106 | 115 | 111 | 113 |
| tan δ (20° C.) | Index value | 100 | 95 | 80 | 65 | 75 | 70 |

The types of raw materials used in Table 1 are shown below.

SBR: styrene-butadiene rubber; trade name: Tufdene E581 (available from Asahi Kasei Chemicals Corporation); oil extended product in which 37.5 parts by mass of extender oil was added per 100 parts by mass of SBR BR: butadiene rubber (Nipol 1220, available from Zeon Corporation)

Silica: 1165MP, available from Solvay

Carbon black: SEAST N (available from Tokai Carbon Co., Ltd.)

Microparticles 1 to 4: microparticles 1 to 4 obtained by Production Examples 1 to 4 described above Microparticle 5: microparticle 5 obtained by Production Example 5 described above (comparative microparticle)

Silane coupling agent: sulfur-containing silane coupling agent, Si69, available from Evonik Degussa Zinc oxide: Zinc Oxide III, available from Seido Chemical Industry Co., Ltd.

Stearic acid: stearic acid beads (available from Nippon Oil & Fats Co., Ltd.)

Anti-aging agent: Santoflex 6PPD, available from Flexsys

Sulfur: "Golden Flower" oil-treated sulfur powder, available from Tsurumi Chemical Industry, Co., Ltd.

Vulcanization accelerator 1: NOCCELER CZ-G, available from Ouchi Shinko Chemical Industrial Co., Ltd.

Vulcanization accelerator 2: Sanceller D-G, available from Sanshin Chemical Industry Co., Ltd.

Oil: Extract No. 4S (available from Showa Shell Sekiyu K. K.)

From the results shown in Table 1, it was found that the rubber compositions for tires of Examples 1 to 4 achieved superior tensile stress at 100% deformation, superior tensile stress at 300% deformation, superior tensile strength at break, or superior tensile elongation at break, superior rebound resilience, and superior tan δ compared to those of the rubber composition for tires of Standard Example 1.

It was found that the rubber composition for tires of Comparative Example 1 exhibited lower tensile strength at break and lower tensile elongation at break compared to those of rubber compositions for tires of Examples 1 to 4 and those of rubber composition for tires of Standard Example 1. Furthermore, it was also found that the tensile stress at 100% deformation, the tensile stress at 300% deformation, and the rebound resilience were also reduced.

The invention claimed is:

1. A rubber composition for a tire, the rubber composition comprising:
   (i) a sulfur vulcanizable elastomer;
   (ii) carbon black or a white filler; and
   (iii) a microparticle having a three-dimensionally crosslinked structure;
   the microparticle being a microparticle obtained by three-dimensionally crosslinking a polymer in a dispersion medium formed from water, an organic solvent, a nonreactive solvent, or a sulfur vulcanizable elastomer, the polymer being formed from an oligomer or prepolymer that has a sulfide bond formed from two or more sulfur atoms in a main chain or that has a thiol group;
   wherein the oligomer or prepolymer further contains the sulfide bond or the thiol group, and another functional group except the thiol group; and the microparticle has a three-dimensionally crosslinked structure formed by interposing the another functional group except the thiol group and at least one selected from the group consisting of the sulfide bond or the thiol group and the functional group except the thiol group, and the another functional group is at least one selected from the group consisting of a hydroxyl group, an isocyanate group, an amino group, a glycidyl group, a silanol group, an alkoxysilyl group, a vinyl group, and a (meth)acryloyl group.

2. The rubber composition for a tire according to claim 1, wherein a number average molecular weight of the oligomer or prepolymer is from 500 to 20000.

3. The rubber composition for a tire according to claim 1, wherein an average particle size of the microparticle constituting the three-dimensionally crosslinked structure is from 0.001 to 100 μm.

4. The rubber composition for a tire according to claim 1, the rubber composition comprising, per 100 parts by mass of the sulfur vulcanizable elastomer, from 1 to 120 parts by mass of the carbon black or the white filler, and from 1 to 50 parts by mass of the microparticle having the three-dimensionally crosslinked structure.

5. The rubber composition for a tire according to claim 1, wherein the crosslinked structure of the microparticle having the three-dimensionally crosslinked structure is a crosslinked structure formed by allowing the functional group to crosslink the polymers in at least one dispersion medium selected from the group consisting of water, an organic solvent, a nonreactive solvent, and the sulfur vulcanizable elastomer.

6. The rubber composition for a tire according to claim 4, wherein the microparticle having the three-dimensionally crosslinked structure is a composite substance containing at least one part of the carbon black or the white filler, or another organic microparticle.

7. A pneumatic tire comprising a tire tread formed from the rubber composition for a tire described in claim 1.

8. The rubber composition for a tire according to claim 2, wherein an average particle size of the microparticle constituting the three-dimensionally crosslinked structure is from 0.001 to 100 μm.

9. The rubber composition for a tire according to claim 8, the rubber composition comprising, per 100 parts by mass of the sulfur vulcanizable elastomer, from 1 to 120 parts by mass of the carbon black or the white filler, and from 1 to 50 parts by mass of the microparticle having the three-dimensionally crosslinked structure.

10. The rubber composition for a tire according to claim 9, wherein the crosslinked structure of the microparticle having the three-dimensionally crosslinked structure is a crosslinked structure formed by allowing the functional group to crosslink the polymers in at least one dispersion medium selected from the group consisting of water, an organic solvent, a nonreactive solvent, and the sulfur vulcanizable elastomer.

11. The rubber composition for a tire according to claim 9, wherein the microparticle having the three-dimensionally crosslinked structure is a composite substance containing at least one part of the carbon black or the white filler, or another organic microparticle.

12. A pneumatic tire comprising a tire tread formed from the rubber composition for a tire described in claim 11.

* * * * *